(12) United States Patent
Irvin

(10) Patent No.: US 7,311,405 B2
(45) Date of Patent: Dec. 25, 2007

(54) SYSTEM AND METHOD FOR DIVERTING AIR IN A VEHICLE

(76) Inventor: Michael Irvin, P.O. Box 600160, San Diego, CA (US) 92160

( * ) Notice: Subject to any disclaimer, the term of this patent is extended or adjusted under 35 U.S.C. 154(b) by 38 days.

(21) Appl. No.: 11/350,996

(22) Filed: Feb. 9, 2006

(65) Prior Publication Data

US 2007/0183039 A1 Aug. 9, 2007

(51) Int. Cl.
*B60R 1/06* (2006.01)
(52) U.S. Cl. ..................................... 359/507
(58) Field of Classification Search ........ 359/507–509; 15/312.1, 316.1, 405, 250.02
See application file for complete search history.

(56) References Cited

U.S. PATENT DOCUMENTS

| | | | |
|---|---|---|---|
| 2,979,365 A * | 4/1961 | Jones | 303/84.2 |
| 3,598,469 A | 8/1971 | Landen et al. | |
| 3,859,899 A | 1/1975 | Mills | |
| 3,877,780 A | 4/1975 | Taylor | |
| 4,350,084 A | 9/1982 | Azzola | |
| 4,439,013 A | 3/1984 | Hagn et al. | |
| 4,462,303 A | 7/1984 | Gebhard | |
| 4,561,732 A * | 12/1985 | Japes | 359/509 |
| 4,763,381 A * | 8/1988 | Williams | 15/250.01 |
| 4,869,581 A | 9/1989 | Matulich | |
| 4,898,458 A | 2/1990 | McDonald | |
| 4,903,581 A | 2/1990 | Nilsson | |
| 4,963,011 A | 10/1990 | Lu et al. | |
| 4,979,809 A * | 12/1990 | Peters | 359/509 |
| 4,981,072 A | 1/1991 | Hanson et al. | |
| 5,097,563 A | 3/1992 | Cowan | |
| 5,140,719 A | 8/1992 | Cowan | |
| 5,179,470 A | 1/1993 | Olson | |
| 5,343,328 A | 8/1994 | Chang | |
| 5,383,054 A | 1/1995 | Chang | |
| 5,419,005 A | 5/1995 | Mori | |
| 5,760,956 A | 6/1998 | Maccan | |
| 5,815,315 A | 9/1998 | Garland et al. | |
| 5,852,846 A | 12/1998 | Gonzalez | |
| 5,868,867 A | 2/1999 | Clukey | |
| 5,903,389 A | 5/1999 | Rumez et al. | |
| 5,953,158 A | 9/1999 | Kamakura et al. | |
| 6,012,817 A | 1/2000 | Kamakura et al. | |
| 6,290,361 B1 | 9/2001 | Berzin | |
| 7,140,740 B1 * | 11/2006 | Cooper | 359/509 |

FOREIGN PATENT DOCUMENTS

| | | | |
|---|---|---|---|
| DE | 3212007 A1 | * | 10/1983 |
| GB | 2262441 A | | 6/1993 |
| WO | WO 88/00142 | | 1/1988 |
| WO | WO 03/013919 | * | 8/2001 |

* cited by examiner

*Primary Examiner*—Angela Ortiz
*Assistant Examiner*—Jade Callaway
(74) *Attorney, Agent, or Firm*—Knobbe Martens Olson & Bear LLP

(57) ABSTRACT

The present invention comprises a system and method for clearing an external driving mirror on a vehicle. The system and method comprise providing a stream of compressed air to clear water, dirt, and/or other substances from the reflective surface of an external driving mirror. This system uses the air source of the vehicle in conjunction with a safety pressure protection valve. This pressure protection valve will shut down the mirror clearing system in the event that the vehicle's primary air system cannot provide a certain minimum amount of air pressure.

28 Claims, 3 Drawing Sheets

SYSTEM AND METHOD FOR DIVERTING AIR IN A VEHICLE

BACKGROUND OF THE INVENTION

1. Field of the Invention

This invention relates to a system for clearing the reflective surface of an external driving mirror of a vehicle. More particularly, the invention relates to a system and method for blowing compressed air onto side mirrors of a truck in order to clear debris and rain from the mirrors.

2. Description of the Related Art

The accumulation of dirt, precipitation, and/or any other substance on the reflective surface of a motor vehicle's external driving mirror is a common problem for operators of motor vehicles. This accumulation prevents and obstructs the operator's visibility to the rear and side of the vehicle. For example, such accumulation could inhibit the operator's ability to see any traffic approaching in an adjoining lane or any vehicles or other obstructions as the vehicle is traveling in reverse. Moisture will collect on the viewing surface of exterior rearview mirrors in heavy fog or rain. This condition has the ability to distort the reflective properties of the mirror and can be dangerous for a driver. This situation is further compounded during periods of darkness when the reflection of headlights upon the moisture covered rearview mirror creates additional visual distortion to images reflected by the mirror. The situation is most dangerous when the external driving mirrors are the only mirrors on the vehicle that provide the operator with visibility to the rear of the vehicle. Such is the case with many large trucks.

A number of solutions have been proposed in the prior art to solve the problem of clearing the rear view mirrors of dirt, water, and/or other substances. These solutions include both passive air deflectors and active air blowers. The first group consists of a variety of devices aimed at collecting the incoming air during the movement of a vehicle and projecting it onto the surface of the rear view mirror. Examples of such solutions can be found in U.S. Pat. Nos. 3,598,469; 4,869,581; 4,898,458; 4,903,581; 4,963,011; 4,979,809; 5,179,470; 5,343,328; 5,760,956; 5,815,315; and 5,868,867. These devices may have some use during a high speed movement of a vehicle; however, at low speeds or when the vehicle is not moving, these devices do not provide adequate air flow to clear the mirrors. Also, they are inherently incapable of conditioning the air flow such as to increase its temperature or reduce humidity, all of which may be helpful in extreme weather conditions.

The use of various active air blowers has also been described. However, many of these systems are overly complex and hence vehicle-specific. They assume incorporation of unique design elements with the on-board air-system of the vehicle and are not easily adapted to be used for a variety of different vehicles. In addition, in many cases the air blowers are underpowered and blow the air at an acute angle towards the surface of the mirror so that the incoming moist and cold air flow simply overwhelms their function. Examples of such devices can be found in the following U.S. Pat. Nos. 3,859,899; 3,877,780; 4,350,084; 4,439,013; 4,462,303; 4,561,732; 4,981,072; 5,383,054; 5,903,389; 5,953,158; and 6,012,817; as well as in a PCT application No. WO 88/00142 and a UK application No. 2,262,441A.

Therefore, the need exists for a system for cleaning an external driving mirror of a vehicle that can safely utilize a vehicle's existing air compressing device.

SUMMARY OF THE INVENTION

Accordingly, it is an object of this invention to provide a system for clearing an external driving mirror of a vehicle that uses the compressed air system of a vehicle.

It is another object of this invention to provide a system that uses a vehicle's existing compressed air system for the pressure source in conjunction with relatively simple add-on components that do not require extensive retrofitting.

It is another object of this invention to provide safety mechanisms and features to a system for clearing an external driving mirror of a vehicle that uses the compressed air system of a vehicle.

In some embodiments, this invention comprises a system for clearing an external driving mirror of a vehicle, wherein said system comprises: an air compressor configured to provide pressurized air to a braking system of said vehicle; an air distribution unit configured to direct compressed air from the air compressor onto a reflective surface of said external driving mirror, and a pressure protection valve disposed between the air compressor and the air distribution unit, wherein said pressure protection valve only provides compressed air to said air distribution unit when the pressure of the pressurized air within the compressor is above a predetermined threshold. Preferably, the vehicle is a truck having an air brake system. Preferably, the system clears both the driving-side and passenger-side external driving mirrors of said vehicle. Preferably, the air distribution unit is a nozzle providing a single stream of compressed air. Preferably, the air distribution unit is disposed on the top of said external driving mirror. Preferably, the air distribution unit directs said compressed air onto the surface of said external driving mirror at an angle of about 60 to about 75 degrees to the reflective surface of the external driving mirror. Preferably, the predetermined threshold is the pressure at which the vehicle's braking system automatically engages the vehicle's brakes. More preferably, the predetermined threshold is about 50 to about 70 PSI.

In some embodiments, this invention comprises a system for clearing an external driving mirror of a vehicle, wherein said system comprises: a means for supplying compressed air, wherein said means for supplying compressed air also supplies compressed air to a braking system of said vehicle; means for directing said compressed air onto a reflective surface of said external driving mirror; and means for regulating the air flow to the system, wherein said means for regulating ensures that said means for supplying compressed air provides a level of compressed air sufficient to maintain at least a minimum pressure in said vehicle's braking system. Preferably, the vehicle is a truck having an air braking system. Preferably, the system clears both the driving-side and passenger-side external driving mirrors of said vehicle. Preferably, the means for directing said compressed air is a nozzle providing a single stream of compressed air. Preferably, the means for directing said compressed air is disposed on the top of said external driving mirror. Preferably, the means for directing said compressed air directs said compressed air onto the surface of said external driving mirror at an angle of about 60 to about 75 degrees to the reflective surface of the external driving mirror. Preferably, the predetermined threshold is a pressure sufficient to maintain at least a minimum pressure in said vehicle's braking system. More preferably, the predetermined threshold is about 50 to about 70 PSI.

In some embodiments, this invention comprises an air system for clearing an external driving mirror of a vehicle, wherein said air system comprises: an air compressor; an air distribution unit configured to direct compressed air from the air compressor onto a reflective surface of said external driving mirror, and an activation switch comprising an always-on setting, wherein when said switch is placed in an always-on setting by a user, air from the compressor flows continuously to the air distribution unit until the user places the activation switch in an off position. Preferably, the vehicle is a truck having an air brake system. Preferably, the system clears both the driving-side and passenger-side external driving mirrors of said vehicle. Preferably, the air distribution unit is a nozzle providing a single stream of compressed air. Preferably, the air distribution unit is disposed on the top of said external driving mirror. Preferably, the air distribution unit directs said compressed air onto the surface of said external driving mirror at an angle of about 60 to about 75 degrees to the reflective surface of the external driving mirror. Preferably, the system comprises a pressure protection valve disposed between the air compressor and the air distribution unit, wherein said pressure protection valve only provides compressed air to said air distribution unit when the pressure of the pressurized air within the compressor is above a predetermined threshold.

In some embodiments, this invention comprises a method of clearing an external driving mirror of a vehicle, said method comprising: providing a flow of compressed air from an air compressor to a reflective surface of said external driving mirror, wherein the air compressor also supplies a pressure of compressed air to a braking system on the vehicle; and stopping the flow of compressed air to the reflective surface when the pressure of air provided to the braking system falls below a predetermined minimum. Preferably, the vehicle is a truck having an air brake system. Preferably, the predetermined threshold is a pressure sufficient to maintain at least a minimum pressure in said vehicle's braking system. More preferably, the predetermined threshold is about 50 to about 70 PSI.

DETAILED DESCRIPTION

Figure 1:
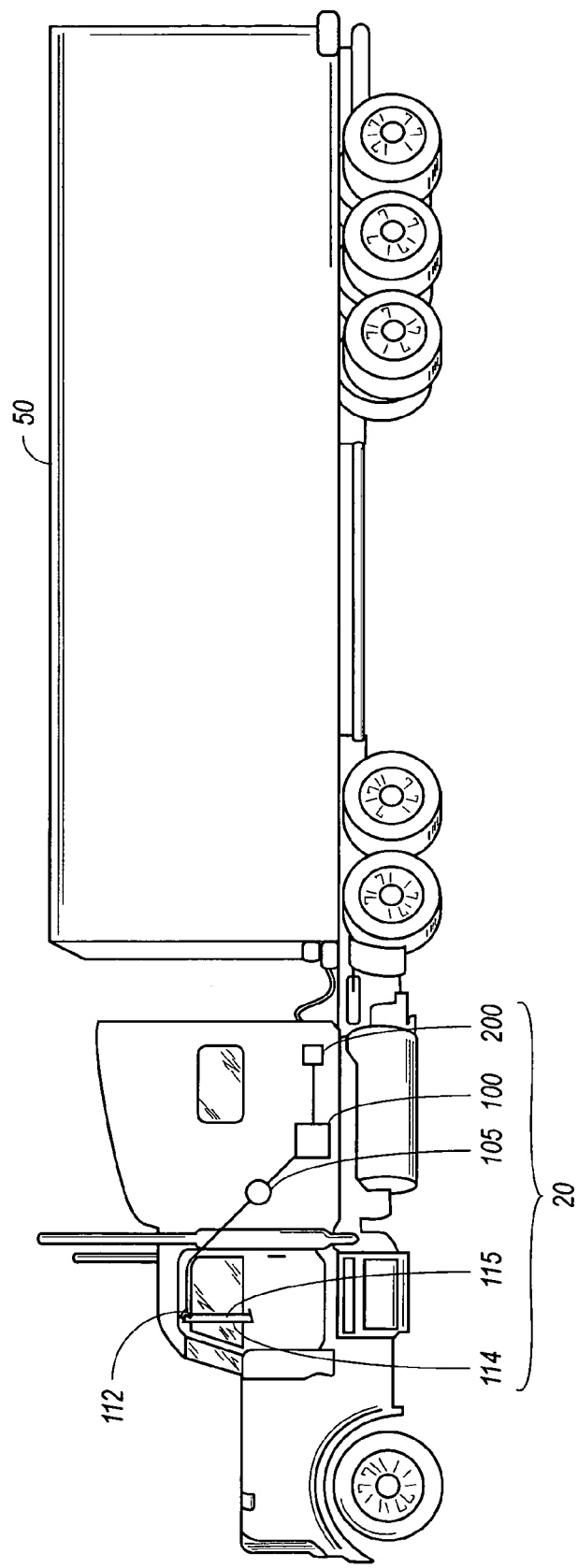
FIG. 1 is a side view of an embodiment of the present invention as used in a tractor-trailer.

Embodiments of the invention relate to a mirror clearing system configured to remove dirt, precipitation, and/or any other substance from a vehicular mirror. Although the present invention can be used in any vehicle having an air compressor or other sufficient source of compressed air, in one embodiment it is used in commercial transport trucks (i.e. trucks having more than two axles), for example tractor-trailers. These larger vehicles typically utilize pressurized air braking systems, which can be configured as part of the mirror clearing system.

Many vehicles, typically heavy-duty or larger vehicles, use air brake systems. Air brake systems use high pressure air—typically about 100 pounds per square inch (psi)—to apply the brakes. Air is generally supplied by an engine driven air compressor and stored in tanks on the tractor and trailer. When the brakes are applied the air usually comes from the compressed air tanks, which are subsequently recharged by the compressor.

Generally speaking, in such a system, when the driver depresses the brake pedal to activate the brakes, compressed air is driven through the air lines to a brake chamber. In typical systems the compressed air forces a pushrod out, which through a series of linkages results in the brake linings being forced outward to make contact with the brake drum. This contact with the brake drum is what causes friction that slows the vehicle. In most systems, the vehicle has an application pressure gauge that is viewable by the operator and which shows how much air pressure is being applied.

An important aspect of most air brake systems is the emergency brake. When the vehicle is driven, the system creates an area of highly pressurized air within an emergency brake chamber. This highly compressed air generally restrains a spring housed inside, which prevents the emergency brakes from engaging. If the pressurized air within the emergency brake chamber falls below a given level, the spring moves outward and causes the emergency brake to automatically engage. Thus, in most systems, if the air pressure within the system falls below a predetermined level, normally about 25-40 pounds per square inch (PSI), the emergency brakes on the vehicle automatically activate and stop the truck from moving.

One embodiment of the invention is a mirror clearing system for removing water, dirt, leaves and other debris from a vehicle mirror. In use, the system provides a stream of pressurized air to the outer reflective surface of the mirror in order to remove any debris. The mirror clearing system can be activated by a switch located within the cab so that the driver does not need to open a window to activate the system. Additionally, the switch may be an "always on" or "always off" type switch so that once toggled into a position, it stays within that position until actively moved by the driver. In one embodiment, the driver can switch the mirror clearing system on and leave it on while the driver performs a particular activity, such as backing up. This allows the driver to see to the back of the truck, even if it is raining or snowing heavily outside. The stream of air from the system will continually keep the mirror cleared of any water or snow that would fall onto the mirror.

In one embodiment, the system uses the internal compressed air system that is part of the truck's braking system as its source of compressed air. In one embodiment, a pressure protection valve is provided within the system so that if the air pressure within the braking system falls below a predetermined point, the mirror clearing system will not function. This would prevent the mirror clearing system from reducing the available compressed air even further in instances wherein there may not be enough compressed air to allow the air brakes to properly function.

FIG. 1 illustrates a perspective view of an embodiment of a mirror clearing system 20 as used in a tractor-trailer 50. FIG. 1 depicts the tractor-trailer 50 having a compressor 100 providing compressed air to a braking system 200. The depicted embodiment of the present invention is attached to tractor trailer's existing compressed air system. A pressure protection valve 105 is disposed between the compressor 100 and an air distribution unit 112 which is mounted onto an external driving mirror 114. The pressure protection valve 105 regulates the amount of air pressure that can pass through the line from the compressor 100 to the air distribution unit 112. As indicated, the distribution unit 112 communicates compressed air onto a reflective surface 115 of the external driving mirror 114.

Figure 2:
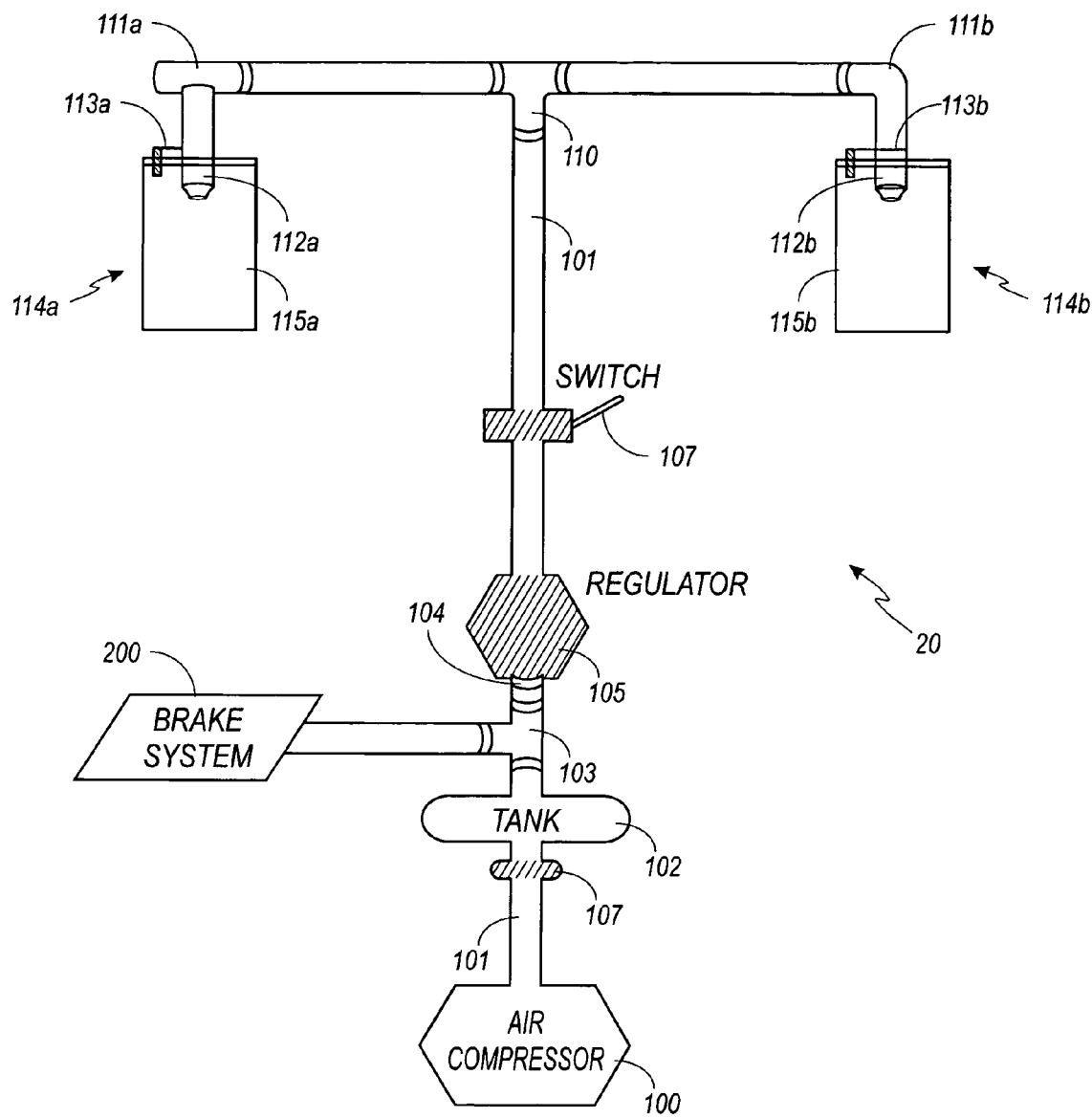
FIG. 2 is a schematic of an embodiment of the invention connected to a vehicle's air compression system.

FIG. 2 provides a more detailed schematic of one embodiment of the present invention. As shown, an air compressor 100 connects to at least one air tank 102 through an air line 101. The air line 101 also connects the air tank 102 to the vehicle's air brake system 200. Typically, the compressor 100 maintains a system pressure of about 100 to 125 pounds per square inch (PSI) while in operation within the truck. The compressor 100 delivers pressurized air through line 101 into the air tank 102 so that the air tank 102 maintains a storage of compressed air for use within the braking system 200 and mirror clearing system 20, as described below. Air line 101 can be made of any material that is adapted to withstand pressures of about 100 to 200 PSI. More preferably, line 101 is made of a plastic resin, such as polyethylene. The air tank 102 supplies compressed air to the rest of the system and is replenished when needed by the compressor 100.

It should be realized that it is not necessary for the brake system 200 to connect directly to the air tank 102. For example, in an alternate embodiment, the brake system 200 and the mirror clearing system 20 each have their own air tank. In this alternate embodiment, each air tank may be filled by the same, or a separate air compressor.

Optionally, the system may include a filter device 107 or other structure for removing water, oil, and/or other materials from the air provided by the compressor 100 to the air tank 102. This optional device or structure may be a filter that is installed between the compressor 100 and the air tank 102. Such a filter 107 may contain a desiccant to aid the removal of water from the system.

The mirror clearing system 20 can be attached to the vehicle's existing air braking system in any manner so long as the connection retains sufficient air pressure for the brake system to function properly. In one embodiment, the air braking system connects to the mirror clearing system through a "T" push fitting 103, through, for example part number AQ6. The push fitting connects to the brake system 200 and also to an air pressure protection valve 105 through the line 101. The line 101 may be made of polyethylene, for example ¼×0.25000×0.170 IDX with a 0.04 inch wall thickness at 200 psi working pressure at 75 degrees Fahrenheit. The line connects to the pressure protection valve 105 via a pressure protection valve input fitting 104. This pressure protection valve input fitting can be any fitting that is sealingly attachable to the pressure protection valve. In one embodiment, the pressure protection valve input fitting 104 is a fitting having part number AQ92P4XR4.

Pressure protection valve 105 can be any device or part that is capable of detecting the pressure of air flowing through it and terminating such air flow if the pressure drops below a given threshold. Preferably, pressure protection valve 105 is preset to cut-off air flow at a given threshold. In one embodiment, the pressure protection valve 105 is manufactured by Williams Manufacturing (part number WM778100), Bendix Corp. (part number 227147BXW), or Midland Corp. (part number KN31000). The pressure protection valve is connected to the rest of the system by a pressure protection valve output fitting 106. This pressure protection valve output fitting can be any fitting that is sealingly attachable to the pressure protection valve. In one embodiment, the pressure protection valve output fitting 104 is a fitting manufactured by Tectran and having part number PL1368-4A. Preferably, pressure protection valve 105 provides a pressurized air flow to the mirror clearing system 20 for clearing one or more external driving mirrors. In one embodiment, the pressure protection valve 105 provides pressurized air until the pressure of the air drops to about 25 to 65 psi. In another embodiment, the pressure protection valve 105 provides pressurized air until the pressure of the air drops to about 50-70 psi. In yet another embodiment, the pressure protection valve 105 provides pressurized air until the pressure of the air drops to about 65 psi. Pressure protection valve output fitting 104 is preferably connected to a toggle switch a 107 line 101.

Toggle switch 107 is typically mounted in the cab of a truck to provide convenient access for the driver. The driver can change the toggle switch 107 from an "on" to an "off" position. In one embodiment, the toggle switch 107 provides multiple "on" settings, wherein each setting provides a different level of air flow through the system in order to clear the external driving mirrors. For example, in a first position the switch would provide approximately 50 PSI of air pressure to the external driving mirrors whereas in a second position the switch would provide approximately 75 PSI of air pressure to the external driving mirrors. Of course, the embodiments of the invention are not limited to any particular air pressure level being applied to the external driving mirrors. In one embodiment, the toggle switch 107 has an always-on setting, wherein when said switch is placed in the always-on setting by a user, air from the compressor flows continuously to the air distribution unit until user places the activation switch in an off position. The toggle switch 107 may be part number BA1450 made by Red Dot Manufacturing.

As described above, toggle switch 107 may be mounted in the interior of the vehicle in such a manner so as to allow the operator of the vehicle to use the switch to turn the mirror clearing system on and off. The toggle switch 107 may be mounted on the dashboard or console on the interior of the vehicle. The mounting of toggle switch 107 may be done using a toggle switch mount bracket (not shown). A toggle switch mount bracket can be any bracket capable of mounting a switch in the interior of the vehide.

Toggle switch 107 can be connected to the air distribution unit 112 on an external mirror via any method that ensures maintenance of the pressure in the system. If it is desired to apply the system to multiple external driving mirrors, a "T" fitting 110 may be utilized to split the pressurized air from the toggle switch 107 to a plurality of mirrors. Thus, the single system can provide pressurized air to both the driver's side mirror and the passenger side mirror at the same time. In one embodiment, the system provides a toggle switch for each mirror so that the driver can select which mirror to clear without using excess air pressure on a mirror that does not need to be cleared.

In the embodiment shown in FIG. 2, The "T" fitting 110 is connected, directly or indirectly, through a pressurized air line to a 90 degree push fitting 111a,b. In one embodiment, the push fining 111a,b is a black plastic elbow fining having part number 141239. As shown, the push fining 111a,b thereafter connects to the air distribution unit 112a,b in order to provide a stream of compressed air to the mirror 115a,b. Air distribution unit 112a,b can be any device or structure capable of directing air onto a surface and air distribution unit 112a,b can be made from any suitable substance. For example, air distribution unit 112a,b can be a nozzle providing a single stream of air, a nozzle providing multiple streams of air, multiple nozzles, an open-ended tube, an aperture or slit, or any structure having an opening that permits air to flow through it.

In one embodiment, the air distribution unit 112a,b is a nozzle providing a single stream of air. The air distribution unit 112a,b may be a brass nozzle having part number AQ34-B2. Generally, air distribution unit 112a,b will distribute air at about 75 to 125 psi to the reflective surface 115a,b of the mirror 114a,b. The air distribution unit 112a,b and 90 degree push fitting 111a,b are attached to fitting mount bracket 113a,b, which is mounted to external driving mirror 114a,b which has at least one reflective surface 115a,b. Fitting mount bracket 113a,b can be mounted to external driving mirror 114a,b or any other structure that is positioned such that air distribution unit 112a,b can provide a flow of air to reflective surface 115a,b. In one embodiment, fining mount bracket 113a,b is mounted to the top of external driving mirror 114a,b. It should be realized that fitting mount bracket 113a,b is mounted to the top of external driving mirror 114a,b in such a manner that air distribution unit 112a,b is aimed at the reflective surface 115a,b of external driving mirror 114a,b at an angle θ of about 5 to about 85 degrees. The air distribution unit 112a,b may, for example, be mounted so as to provide a stream of pressurized air to the reflective surface 115a,b at angles of about 5, 10, 15, 20, 25, 30, 35, 40, 45, 50, 55, 60, 65, 70, 75, 80, or 85 degrees in some embodiments. It should be realized that the air distribution unit 112a,b is mounted in one embodiment of the invention so as to provide a stream of pressurized air to the reflective surface 115a,b at angles of about 60 to about 75 degrees. In another embodiment, the system may provide a pulsatile air flow through the distribution unit 112a,b.

Figure 3:
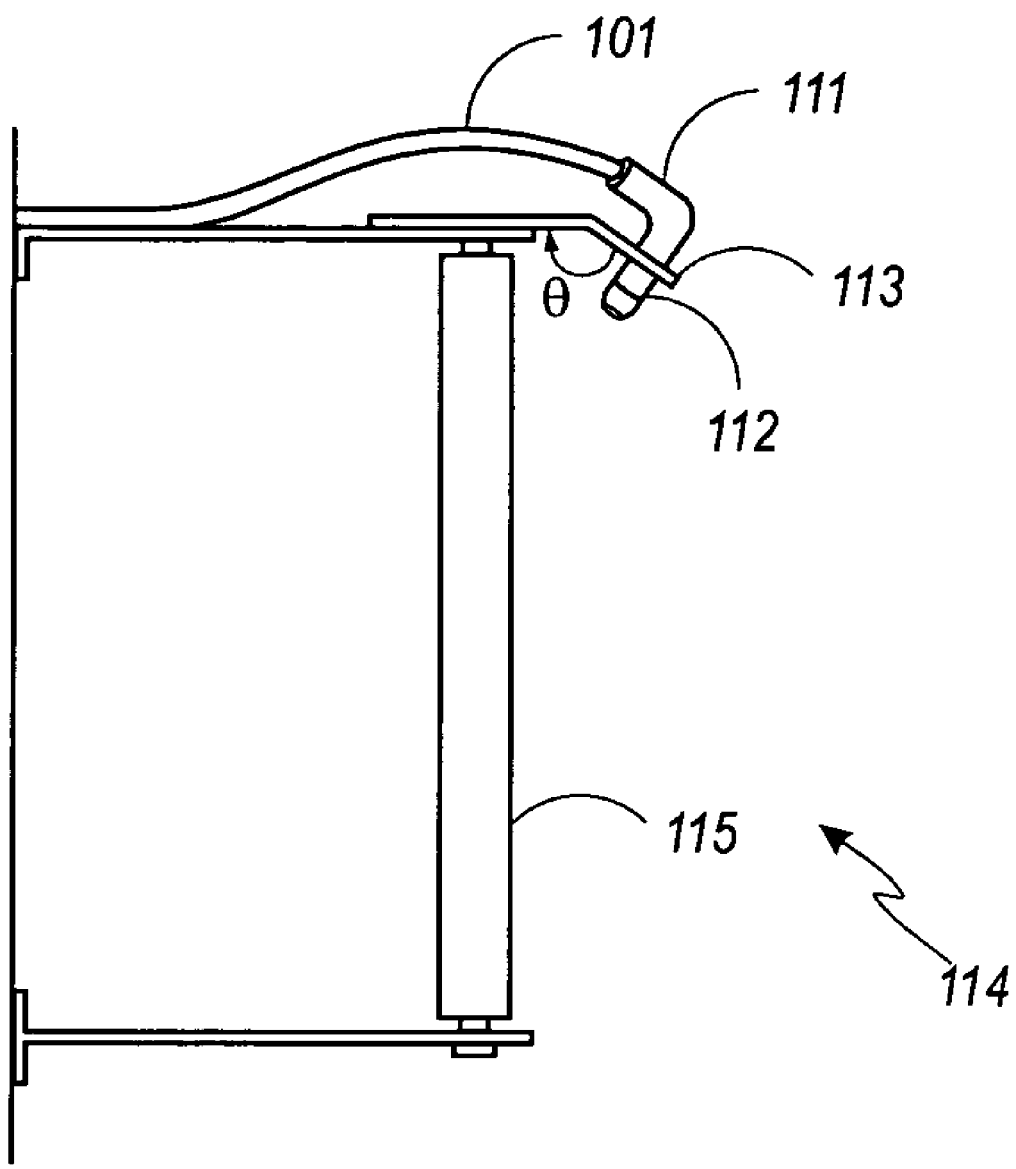
FIG. 3 is a side view of an embodiment of the invention present on an external driving mirror.

FIG. 3 provides a side view of an external driving mirror 114 with an embodiment of the mirror clearing system installed. As indicated, fitting mount bracket 113 is reversibly mounted to the top of external driving mirror 114 in such a manner that air distribution unit 112 is aimed at the reflective surface 115 of external driving mirror 114 at an angle θ. As shown, air line 101 connects to 90 degree push fitting 111. Push fitting 111 thereafter connects to air distribution unit 112. Air distribution unit 112, in this embodiment comprising a brass nozzle, directs a single stream of air onto the reflective surface 115 of the external driving mirror 114. As would be expected, the stream of air flows down the reflective surface and removes any type of water, dirt, dust or other debris that may fall onto the reflective surface 115.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A system for clearing an external driving mirror of a vehicle, wherein said system comprises:
    an air compressor configured to provide pressurized air to a braking system of said vehicle;
    an air distribution unit configured to direct compressed air from the air compressor onto a reflective surface of said external driving mirror; and
    a pressure protection valve disposed between the air compressor and the air distribution unit, wherein said pressure protection valve only provides compressed air to said air distribution unit when the pressure of the pressurized air within the braking system is above a predetermined threshold.

2. The system of claim 1 wherein said vehicle is a truck having an air brake system.

3. The system of claim 1 wherein said system clears both the driving-side and passenger-side external driving mirrors of said vehicle.

4. The system of claim 1 wherein said air distribution unit is a nozzle providing a single stream of compressed air.

5. The system of claim 1 wherein said air distribution unit is disposed on the top of said external driving mirror.

6. The system of claim 1 wherein said air distribution unit directs said compressed air onto the surface of said external driving mirror at an angle of about 15 to about 80 degrees to the reflective surface of the external driving mirror.

7. The system of claim 1 wherein said air distribution unit directs said compressed air onto the surface of said external driving mirror at an angle of about 60 to about 75 degrees to the reflective surface of the external driving mirror.

8. The system of claim 1 wherein said predetermined threshold is the pressure at which the vehicle's braking system automatically engages the vehicle's brakes.

9. The system of claim 1 wherein said predetermined threshold is about 50 to about 70 PSI.

10. A system for clearing an external driving mirror of a vehicle, wherein said system comprises:
    means for supplying compressed air, wherein said means for supplying compressed air also supplies compressed air to a braking system of said vehicle;
    means for directing said compressed air onto the surface of said external driving mirror; and
    means for regulating the air flow to the system, wherein said means for regulating ensures that said means for supplying compressed air provides a level of compressed air sufficient to maintain at least a minimum pressure in said vehicle's braking system.

11. The system of claim 10 wherein said vehicle is a truck having an air braking system.

12. The system of claim 10 wherein said system clears both the driving-side and passenger-side external driving mirrors of said vehicle.

13. The system of claim 10 wherein said means for directing said compressed air is a nozzle providing a single stream of compressed air.

14. The system of claim 10 wherein said means for directing said compressed air is disposed on the top of said external driving mirror.

15. The system of claim 10 wherein said air distribution unit directs said compressed air onto the surface of said external driving mirror at an angle of about 15 to about 80 degrees to the reflective surface of the external driving mirror.

16. The system of claim 10 wherein said means for directing said compressed air directs said compressed air onto the surface of said external driving mirror at an angle of about 60 to about 75 degrees to the reflective surface of the external driving mirror.

17. The system of claim 10 wherein said minimum pressure is about 50 to about 70 PSI.

18. An air system for clearing an external driving mirror of a vehicle, wherein said air system comprises:
    an air compressor configured to provide pressurized air to a braking system of said vehicle;
    an air distribution unit configured to direct compressed air from the air compressor onto a reflective surface of said external driving mirror;
    an activation switch comprising an always-on setting, wherein when said switch is placed in an always-on setting by a user, air from the compressor flows continuously to the air distribution unit until the user places the activation switch in an off position; and
    a pressure protection valve disposed between the air compressor and the air distribution unit, wherein said pressure protection valve only provides compressed air to said air distribution unit when the pressure of the pressurized air within the braking system is above a predetermined threshold.

19. The system of claim 18 wherein said vehicle is a truck having an air brake system.

20. The system of claim 18 wherein said system clears both the driving-side and passenger-side external driving mirrors of said vehicle.

21. The system of claim 18 wherein said air distribution unit is a nozzle providing a single stream of compressed air.

22. The system of claim 18 wherein said air distribution unit is disposed on the top of said external driving mirror.

23. The system of claim 18 wherein said air distribution unit directs said compressed air onto the surface of said external driving mirror at an angle of about 15 to about 80 degrees to the reflective surface of the external driving mirror.

24. The system of claim 18 wherein said air distribution unit directs said compressed air onto the surface of said external driving mirror at an angle of about 60 to about 75 degrees to the reflective surface of the external driving mirror.

25. A method of clearing an external driving mirror of a vehicle, said method comprising:

providing a flow of compressed air from an air compressor to a reflective surface of the external driving mirror, wherein the air compressor also supplies a pressure of compressed air to a braking system on the vehicle; and stopping the flow of compressed air to the reflective surface when the pressure of air provided to the braking system falls below a predetermined threshold.

26. The method of claim 25 wherein said vehicle is a truck having an air brake system.

27. The method of claim 25 wherein said predetermined threshold is a pressure sufficient to maintain at least a minimum pressure in said vehicle's braking system.

28. The method of claim 25 wherein said predetermined threshold is about 50 to about 70 PSI.

* * * * *

UNITED STATES PATENT AND TRADEMARK OFFICE
CERTIFICATE OF CORRECTION

PATENT NO. : 7,311,405 B2 Page 1 of 1
APPLICATION NO. : 11/350996
DATED : December 25, 2007
INVENTOR(S) : Irvin It is certified that error appears in the above-identified patent and that said Letters Patent is hereby corrected as shown below:

Column 2, line 9, please delete "retrofitting." and insert -- retro-fitting. --, therefor.

Column 6, line 21, after "until" insert -- the --.

Column 6, line 33, please delete "vehide." and insert -- vehicle. --, therefor.

Column 6, line 49, after "push" delete "fining" and insert -- fitting --, therefor.

Column 6, line 49, after "elbow" delete "fining" and insert -- fitting --, therefor.

Column 6, line 50, please delete "fining" and insert -- fitting --, therefor.

Column 7, line 2, after "b" insert -- , --.

Column 7, line 7, please delete "fining" and insert -- fitting --, therefor.

Signed and Sealed this

Thirtieth Day of September, 2008

JON W. DUDAS
*Director of the United States Patent and Trademark Office*